Nov. 12, 1957     C. P. KLÖPPING ET AL     2,813,218
ELECTRIC DISCHARGE TUBE
Filed March 18, 1952

INVENTORS
Carel Peter Klöpping
Hendrik Jacobus DE Visser
By
Agent

United States Patent Office 2,813,218
Patented Nov. 12, 1957

2,813,218

ELECTRIC DISCHARGE TUBE

Carel Peter Klöpping and Hendrik Jacobus de Visser, Eindhoven, Netherlands, assignors, by mesne assignments, to North American Philips Company, Inc., New York, N. Y., a corporation of Delaware Application March 18, 1952, Serial No. 277,216

Claims priority, application Netherlands April 20, 1951

3 Claims. (Cl. 313—249)

This invention relates to an electric discharge tube for generating electromagnetic radiation of shortwave-lengths.

In electric discharge tubes designed to operate at very high frequencies, the electrode spacing is very important and consequently a construction is employed in which one electrode, in the form of a hollow cylinder, is sealed in the wall of the tube and a movable electrode is arranged in threaded engagement therewith. After the movable electrode has been suitably positioned, it is fixed in position by flowing solder along the threads which hardens and forms a vacuum-tight seal. This arrangement has a disadvantage in that during subsequent evacuation and degasification of the tube, the solder melts and is forced into the interior of the tube thereby impairing the vacuum-tight seal.

It is a main object of this invention to provide a construction for electric discharge tubes operating at very high frequencies which is vacuum-tight without the use of solder.

This and other objects of the invention will appear from the description that follows.

According to the invention, the hollow cylindrical member, into which the movable electrode is threaded, it sealed in a vacuum-tight manner by means of a metal disc affixed to the outer end of this member. With such an arrangement, sufficient solder is flowed into the threads only to fix the position of the movable electrode, the vacuum-tight seal being provided by the metal disc affixed to the outer end of the cylindrical member.

In a preferred embodiment, the metal disc is affixed to the tubular member by being welded thereto while the bottom surface of the tube is supported in a stay member. This arrangement permits the disc to be welded to the tubular member of the tube without deforming this member as would be the case if the tube was kept in position during the welding operation by the grip pressure of the welding electrodes on this tubular member. It has proved that the welding pressure of the top-welding electrode can be transmitted via the glass portions and discs of the electrodes to the bottom surface without cracking the glass portions of the tube.

The invention will now be described with reference to the accompanying drawing in which.

Figures 1, 2:
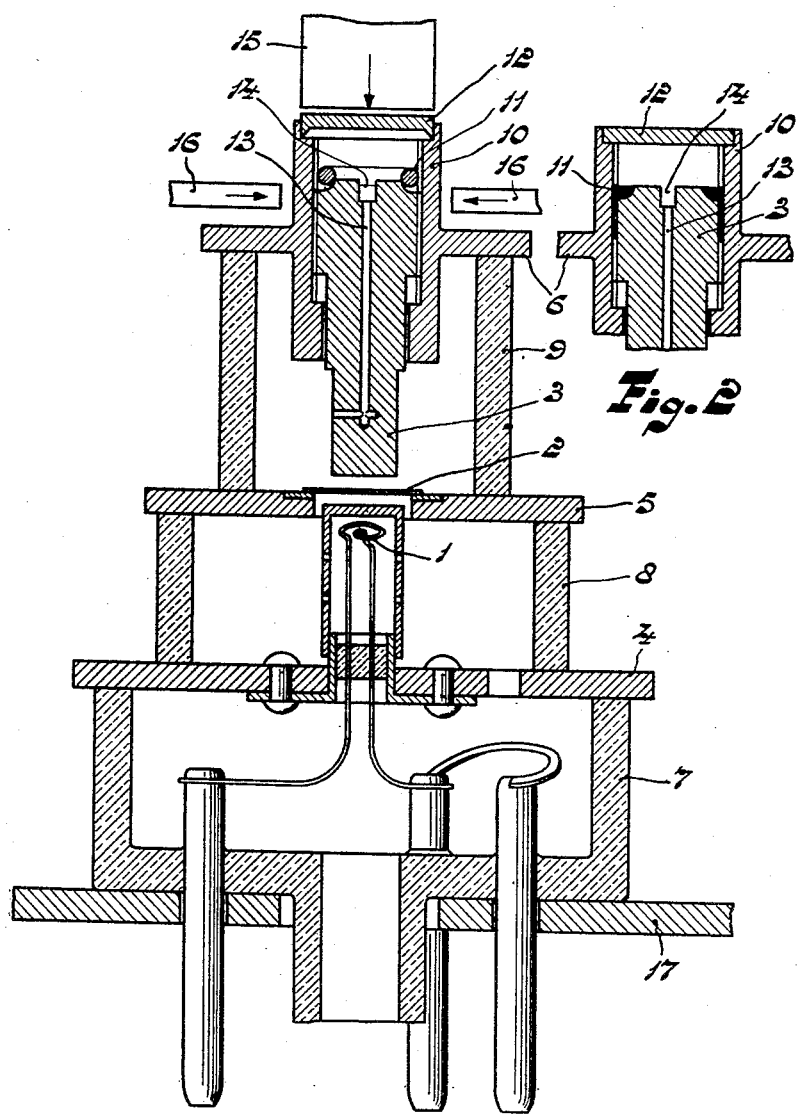
Fig. 1 is a view, in cross section, of one form of electric discharge tube according to the invention during processing.
Fig. 2 is a view, in cross-section, of the upper portion of the tube shown in Fig. 1 when completed.

Referring to Fig. 1, an electric discharge tube comprises a cathode 1, a control grid 2, and an anode 3 having a screw thread on its outermost surface. These electrodes 1, 2, and 3 are secured by means of sealed-in metal discs 4, 5 and 6, respectively, to glass parts 7, 8 and 9 of a tubular housing. The sealed-in metal disc 6 is provided with a hollow cylindrical member 10 having a screw thread on its inner surface. The anode 3 is in threaded engagement with the cylindrical member 10, by means of which engagement, the spacing between the anode 3 and the grid 2 may be adjusted for the operative distance. The upper surface of the anode 3 is provided with a slot 14 for accommodating a screw driver for this purpose.

Tin solder 11, shown as a ring in Fig. 1 and as melted in Fig. 2, is interposed along the threads to fix the position of the anode 3 with respect to the cylindrical member 10.

A metal disc 12 having a tapered "welding edge" (Fig. 1), serving to limit the welding current, is arranged in a recess on the upper part of the cylindrical member 10. The upper part of the anode 3 is provided with a channel 13 by means of which the air enclosed in the cavity between the disc 12 and the anode 3 may be exhausted during evacuation of the tube.

The welding of the disc 12 to the cylindrical member 10 take place in the following manner: The tube is seated or supported on a stay member 17. The welding electrode 15 is pressed into contact with the outer surface of the disc 12 and exerts pressure at right angles thereto. This pressure is transmitted via the glass portions 9, 8, 7 of the housing and the discs 6, 5, 4 to the stay member 17 on which the tube is supported. Therefore the welding jaws 16 ought only clamp the cylindrical member so strongly that a good contact is obtained. The jaws 16 do not contribute in holding the tube against the pressure of welding electrode 15, as is the case in ordinary welding machines. So no danger is present for the cylinder 10 to be deformed by the welding electrodes 16. The welding pressure forces the disc 12 into the recess on the upper part of the cylindrical member 10 (Fig. 2) which is then welded thereto. During the welding, the heat developed melts the ring of tin solder 11 (Fig. 1) so that it flows into the screw threads (Fig. 2) and fixes the position of the anode 3. If, during degasification of the metal parts of the tube at high temperature, the solder 11 melts, it remains in the screwthread due to the equalization of air pressure above and below it.

It is obvious that the same arrangement may be utilized for adjusting the spacing between any two electrodes in the tube, and is not limited to the anode.

While the invention has been described in connection with specific examples and in specific applications, other modifications thereof will be readily apparent to those skilled in the art without departing from the invention as defined in the appended claims.

What we claim is:

1. An electric discharge tube comprising an evacuated envelope and a plurality of electrodes within said envelope, said envelope including a metal cylindrical support member mounted in said envelope and communicating with the inside and outside of said envelope and supporting one of said electrodes spaced a predetermined distance from another of said electrodes, said one electrode threadingly engaging said cylindrical member and defining with the outer end of the latter a cavity, means including a metal member vacuum-tight sealing off the outer end of said cylindrical member, and solder means wholly within the cylindrical member and communicating with said cavity and the interior of said envelope and securing together said one electrode and said cylindrical member, said electrode having an aperture through which the said cavity and the interior of the envelope communicate and thus are maintained at substantially the same pressure.

2. An electric short-wave discharge tube comprising a tubular housing, a plurality of flat electrodes enclosed by said housing, a plurality of discs sealed in the wall of said housing and supporting said electrodes in their operative positions, one of said discs including a hollow cylindrical metal member communicating with the inside and outside of said housing, one of said electrodes being in threaded engagement with said cylindrical member for adjusting the spacing between said electrode and another of said electrodes, a metal disc affixed to the outer end of said cylindrical member and providing an air-tight seal for said cylindrical member, and solder means disposed wholly within said cylindrical member and fixing said electrode against rotation within said cylindrical member, said electrode having an aperture through which the space within the cylindrical electrode between the solder means and the metal disc communicates with the interior of the housing.

3. A tube as set forth in claim 2 wherein the metal disc is welded to the outer end of said cylindrical member.

References Cited in the file of this patent

UNITED STATES PATENTS

| | | |
|---|---|---|
| 2,212,556 | Baier | Aug. 27, 1940 |
| 2,411,184 | Beggs | Nov. 19, 1946 |
| 2,416,565 | Beggs | Feb. 25, 1947 |
| 2,444,303 | McCarthy | June 29, 1948 |
| 2,460,141 | McArthur | Jan. 25, 1949 |
| 2,481,026 | Law et al. | Sept. 6, 1949 |
| 2,491,971 | Hall et al. | Dec. 20, 1949 |
| 2,525,468 | Alpert | Oct. 10, 1950 |